United States Patent
Roy (10) Patent No.: US 6,947,432 B2
(45) Date of Patent: Sep. 20, 2005

(54) H.323 BACK-END SERVICES FOR INTRA-ZONE AND INTER-ZONE MOBILITY MANAGEMENT

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 851 days.

(21) Appl. No.: 09/801,914

(22) Filed: Mar. 9, 2001

(65) Prior Publication Data

US 2001/0030952 A1 Oct. 18, 2001

Related U.S. Application Data (63) Continuation-in-part of application No. 09/642,279, filed on Aug. 18, 2000, now Pat. No. 6,859,448, which is a continuation-in-part of application No. 09/642,142, filed on Aug. 18, 2000, now Pat. No. 6,775,255, which is a continuation-in-part of application No. 09/642,298, filed on Aug. 18, 2000, now Pat. No. 6,732,177.
(60) Provisional application No. 60/189,706, filed on Mar. 15, 2000.

(51) Int. Cl.$^7$ .............................. H04L 12/28; H04Q 7/24
(52) U.S. Cl. ....................... 370/401; 370/338; 455/433; 455/422.1
(58) Field of Search ................................. 370/401, 331, 370/328, 310, 338; 455/433, 432.1, 422.1, 456.1; 709/249; 713/161, 168

(56) References Cited

U.S. PATENT DOCUMENTS

| | | | |
|---|---|---|---|
| 5,793,762 A | | 8/1998 | Penners et al. |
| 6,611,516 B1 | * | 8/2003 | Pirkola et al. ............... 370/352 |
| 6,674,734 B1 | * | 1/2004 | Hsu et al. ................... 370/331 |
| 6,785,223 B1 | * | 8/2004 | Korpi et al. ................. 370/218 |
| 6,788,660 B1 | * | 9/2004 | Agrawal et al. ............. 370/331 |

FOREIGN PATENT DOCUMENTS

| | | |
|---|---|---|
| WO | WO 98/59467 | 12/1998 |
| WO | WO 00/33523 | 6/2000 |
| WO | WO 00/79814 | 12/2000 |
| WO | WO 00/79825 | 12/2000 |

OTHER PUBLICATIONS

European Search Report.
Wanjiun Liao, "Mobile Internet Telephony: Mobile extensions to H.323", IEEE, 1999, pp. 12–19.
Olle Granberg, "GSM On The Net", Ericsson Review No. 4, 1998, pp. 184–191.

* cited by examiner

*Primary Examiner*—Duc Ho

(57) ABSTRACT

Back-end services such as authentication and mobile H.323 entity location update services include providing an authentication function within the control of a home gatekeeper and a distributed visitor location function (VLF) under the same control. In inter-zone communications, several embodiments are described for providing a home location functionality (HLF). The several HLF architectures include a distributed HLF, a centralized HLF, and a centralized HLF with communications via VLF only. Message flows can be smoothed by utilizing parallel message transmission where, for example, both a home and a visited location database may be signaled simultaneously and by utilizing direct messaging, for example, whereby a VLF communicates directly with a centralized HLF rather than via its associated gatekeeper function.

11 Claims, 6 Drawing Sheets

Intra-Zone Mobility Management

Figure 1: Intra-Zone Mobility Management

Figure 2: Information Flows for Location Updates for Roaming within the Home Zone

Figure 3: Location Update Management Architecture with Distributive HLF Architecture Figure 4: Location Update Management Information Flows with Distributive HLF Architecture Figure 5: Smooth Location Updates for Signaling Flow Optimization Figure 6: Mobility Management Architecture sharing a single HLF Database in a given Administrative Domain Figure 7: Location Update Management Information Flows with Centralized HLF Architecture in an Administrative Domain Figure 8: Mobility Management Architecture sharing a single HLF Database in a given Administrative Domain (Communications with HLF done via VLF only)

Figure 9: Location Update Management Information Flows with Centralized HLF Architecture in an Administrative Domain where Communications with the HLF are done via the VLFs only

H.323 BACK-END SERVICES FOR INTRA-ZONE AND INTER-ZONE MOBILITY MANAGEMENT

This application is a continuation-in-part application of U.S. patent application Ser. No. 09/642,279 entitled "H.323 Mobility Architecture and Protocol for Terminal, User and Service Mobility," filed Aug. 18, 2000 and which issued Feb. 22, 2005 as U.S. Pat. No. 6,859,448 ("the '448 patent"): U.S. patent application Ser. No. 09/642,142 entitled "H.323 Mobility Protocol for Terminal, User and Service Mobility," filed Aug. 18, 2000 and which issued on Aug. 10, 2004 as U.S. Pat. No. 6,775,255 ("the '255 patent"); and U.S. patent application Ser. No. 09/642,298 entitled "Intelligent Signalling Scheme for Computer-Readable Medium for H.323 Mobility Architecture," filed Aug. 18, 2000 and which issued on May 4, 2004 as U.S. Pat. No. 6,732,177 ("the '177 patent"). This application further claims the benefit of U.S. Provisional Application Ser. No. 60/189,706, filed Mar. 15, 2000.

BACKGROUND OF THE INVENTION

1. Technical Field

The present invention relates to the field of mobility management services in a network utilizing the H.323 protocol and, in particular, to providing back-end services facilitating intra-zone and inter-zone terminal mobility when a mobile H.323 terminal moves within their home zone and to and between foreign zones, the back-end services including authentication and mobile terminal location database services.

2. Description of the Related Arts

Figure 1:
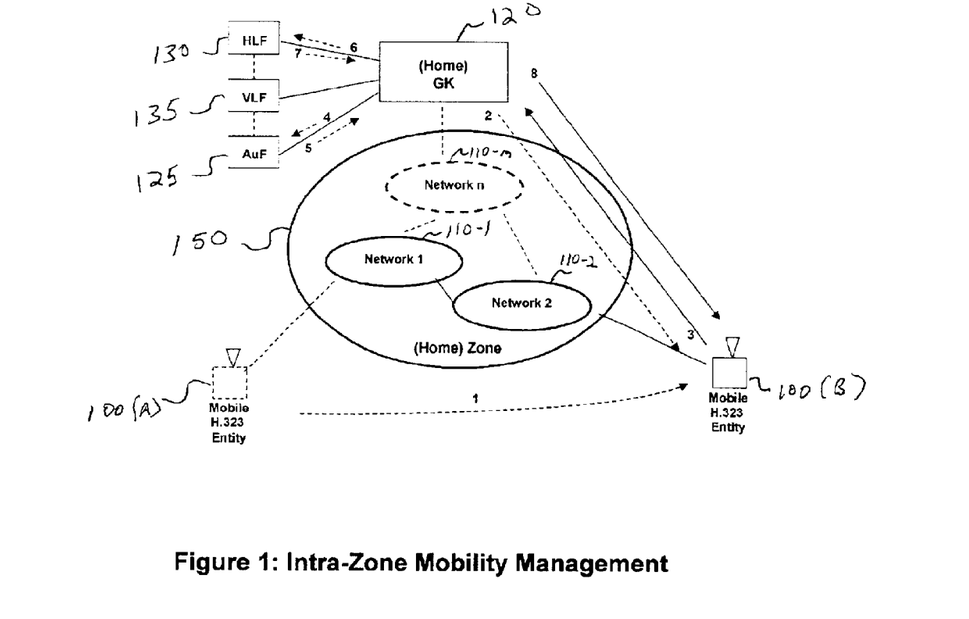
FIG. 1 is an overview figure showing a typical scenario whereby an H.323 mobile entity moves within its home zone or administrative domain from one network and point of attachment A to another point of attachment B in another network showing an H.323 gatekeeper GK administered home location functionality (HLF), visitor location functionality (VLF) and an authentication functionality (AF) associated therewith in accordance with the present invention. Depicted arrows represent typical communication messages utilized for mobility management including back-end services.

In my prior United States Patent Applications bearing Ser. No. 09/642,142 (issued as the '255 patent), Ser. No. 09/642,279 (issued as the '448 patent) and 09/642,298 (issued as the '177 patent), filed Aug. 18, 2000, incorporated herein by reference as to their entire contents, there is shown in the Figures and described a real-time mobility protocol, architecture and intelligent signaling scheme for computer-readable medium for real-time mobile multimedia communications and conferencing over packet-based networks. At the time of filing those applications and as shown in FIG. 1 of each, protocols had not yet been fully defined for providing for mobility management when a mobile H.323 moves within their home zone and to foreign zones outside their home zone.

H.323 mobility management enables multimedia communications utilizing packetized data. H.323 mobility management includes the following functionality: discovery by an administrative domain of a mobile H.323 terminal and discovery by the mobile terminal of their host zone administrative domain, registration of the terminal with the domain, location of the terminal in the domain, updating administrative location databases once the mobile terminal is discovered and a move determined, call establishment for the terminal requesting a call and roaming by the terminal from zone to zone during a call.

In H.323, call establishment and termination are performed respectively before and after a call. Before and after an H.323 terminal makes a call, the terminal needs to be discovered and registered in the zone in which it is located. During a call, a mobile H.323 terminal may roam from one zone to another. There is a need for extensions to H.323 that will provide mobility back-end administrative services including the ability to administer roaming.

An H.323 gatekeeper (GK) needs to have certain additional features to support mobile users. If a normal GK defined in the H.323 standard is located proximate to an H.323 terminal and the GK does not support mobility, a mobile user or terminal will not be able to obtain the desired service.

A mobile entity can discover a mobile GK through the mobility gatekeeper advertisement (MGA) message or may send periodic gatekeeper request GRQ request messages as it moves from one point of attachment to another. If a mobile entity knows that it is in a foreign zone (or foreign network), it can use the GRQ message (extended to take care of mobility) to announce its presence and need for a GK functionality. In H.323, every administrative domain is presumed to have a GK functionality, otherwise, a visiting H.323 mobile entity will not receive service in that zone. An alternative method is for an H.323 mobile entity to analyze the MGA message sent periodically by an H.323 GK in its zone. Once a GK is determined, an endpoint is registered to the GK for admission to system access through a registration, admission and status (RAS) channel. Since in H.323, call establishment and termination are performed before and after a call, respectively, there is a need in the art for extensions in H.323 that will provide mobility back-end services (BES) including mobile terminal location update and terminal and service authentication services required for supporting a roaming mobile terminal prior to call establishment.

SUMMARY OF THE INVENTION

According to the principles of the present invention, there is provided a first database for home location functionality (HLF) and a second database for visitor location functionality (VLF) as well as an authentication functionality, for example, to determine if the user of the H.323 terminal is in-deed who the network believes the user to be and to determine authorization for receiving a requested service, the user's credit-worthiness and the like. If a mobile entity visits a zone that is not its home zone, the H.323 GK uses the VLF of the present invention for keeping a mobile terminal's location information. If a mobile terminal moves within its home zone, the GK uses the HLF for updating the mobile terminal's location information. In one embodiment, there may be a distributed architecture of VLF functionality, for example, where a visited H.323 gatekeeper may have a VLF and a visiting H.323 gatekeeper may have a separate or visiting VLF. In one embodiment, the home location functionality may be distributed or preferably centralized for the visiting and visited zones.

According to a method of providing back-end services in accordance with the present invention, authentication is performed once an H.323 terminal is discovered to have moved, the authentication function being performed utilizing H.235 or other authentication request and confirm/reject messaging steps. Then, the location addresses are updated according to VLF and HLF processes.

According to a further method of providing back-end services in an inter-zone communication, location management comprises the steps of exchanging binding and unbinding update messages with the HLF and VLF functions. Because some of the message exchange can occur after authentication and after it is clearly determined where the terminal is, there is further described a smooth location update method as an alternative embodiment so that a call, if requested, may be processed as soon as possible for a calling or called H.323 mobile entity.

These and other features of the present invention will be readily understood from reviewing the drawings and the detailed description of the various embodiments which follows. The following definitions are provided from the H.323 standard and will be adhered to in the following detailed description of the invention and claims:

Mobile Entity: Defined as the H.323 entity that changes its point of attachment (Network and/or H.323 point of attachment) from one attachment to another. A mobile entity can continue to communicate with other H.323 entities at any location as it moves from place to place.

Home GK: A gatekeeper in a mobile entity's home zone territory which performs the necessary management functions for mobile entities that have departed the home zone, and maintains current location information for each H.323 terminal. Any H.323 GK that provides the support for H.323 mobile entities can act as a home GK.

Home Network: Defined as the network in the mobile entity's home network and, the said network has been declared by the mobile entity as its home network (e.g., an IP subnetwork in the home zone declared as a home network by a mobile entity).

Home Network Address: Defined as the address of the network point of attachment in the home network of a mobile entity (e.g., IP address [RAS transport address] in a home IP subnetwork). If the transport address contains the network address in addition to the TSAP, the home transport address will also contain the home network address.

Foreign GK: A gatekeeper on a mobile entity's visited- or visiting-zone which cooperates with the home GK to have the information related to the mobile entity while it is away from its home zone. Any H.323 GK that provides the support for H.323 mobile entities can act as a foreign GK.

Foreign Network: It is the network in the mobile entity's foreign zone and, the said network has been declared by the mobile entity as its foreign network (e.g., an IP subnetwork in a foreign zone of a mobile entity).

Care-of Network Address: It is the address of the network point of attachment in a foreign network of a mobile entity (e.g., IP address [RAS transport address] in a foreign IP subnetwork). If the transport address contains the network address in addition to the TSAP, the care-of transport address will also contain the care-of network address.

Visiting GK: Visiting GK is defined as a foreign GK that the mobile entity is presently visiting. That is, the mobile entity is currently residing within a foreign zone that is managed by a foreign GK.

Visited GK: A visited GK is the foreign GK that had been visited by the mobile entity previously.

Target GK: It is the foreign GK that the mobile entity intends to visit.

Target Network: It is the target network that the mobile entity intends to visit.

Mobile GK: Either a home GK or a foreign GK that has mobility management capability.

Home Zone: A home zone is a zone that is managed by a home GK of a mobile entity.

Foreign Zone: It is a zone that is managed by a foreign GK.

Visiting Zone: A zone other than a mobile entity's home zone to which the mobile entity is currently residing. That is, it is a foreign zone in which the mobile entity is presently visiting.

Visited Zone: A zone other than a mobile entity's home zone that the mobile entity has visited previously. In other words, it is the foreign zone which had been visited by the mobile entity previously.

Target Zone: A zone other than a mobile entity's home zone that the mobile entity intends to visit.

Visiting Entity: It is a mobile entity that is residing in a visiting zone managed by a visiting GK.

Visiting Terminal: It is a mobile H.323 terminal that is residing in a visiting zone managed by a visiting GK.

Visiting User: It is a mobile H.323 user that is residing in a visiting zone managed by a visiting GK.

Visitor List: The list of mobile entities currently visiting a foreign zone.

GK Advertisement for Mobility Services: Foreign gatekeepers advertise their presence by using a special message to provide services for mobile entities.

Care-of Address: The termination address of the point of attachment (e.g., care-of network address of mobile entity or care-of address of a foreign GK where a mobile entity is residing) for messages forwarded to the mobile entity while it is away from its home network and/or GK). There are two different types of care-of address: a foreign GK care-of address with which a mobile entity is registered; a care-of network address which the mobile entity has associated with one of its own network interfaces (e.g., a temporary IP address of the visitor may be acquired dynamically using the Dynamic Host Configuration Protocol [DHCP]).

BRIEF DESCRIPTION OF THE DRAWINGS

FIG. 3 does not include arrows as does FIG. 1 but serves as the basis for discussion of message flows depicted in FIGS. 4 and 5 for an inter-zone mobile entity.

FIG. 6 does not include arrows but serves as the basis for discussion of message flows depicted in FIG. 7.

DETAILED DESCRIPTION OF THE PREFERRED EMBODIMENTS

Referring to FIG. 1, there is shown an H.323 telecommunications network and, more particularly, a typical scenario whereby an H.323 mobile entity 100 moves within its home zone or administrative domain from one network and point of attachment A to another point of attachment B in another network. By way of example, mobile H.323 entity 100 may move from point of attachment (A), depicted as 100(A) where it is originally associated with a first network 110-1 within (home) administrative zone or domain 150 having a (home) H.323 gatekeeper function 120. The mobile entity is typically a telecommunications terminal 100. First network 110-1 may be associated with a local or long distance network service provider such as AT&T. Mobile entity 100 may subscriber to a plurality of services including wireless services, cable television services, paging services, Internet services. Internet and other services may be received from plural entities such as the cable television service provider or the long distance service provider. All of these services and credit ratings and personal data are stored in a mobile entity authentication database according to the present invention (AF) which may be distributed or centralized but within control of a home H.323 gatekeeper function 120. Mobile entity 100 may move to point of attachment B associated with a second network 110-2 or any other network in the zone 150, such as a network 110-n. There is shown a (home) H.323 gatekeeper GK 120 which provides administrative services for the home zone. The home gatekeeper GK 120 according to the present invention administers home location functionality (HLF) 130, visitor location functionality (VLF) 135 and an authentication functionality (AuF) 125 associated therewith which may comprise databases for storing mobile entity service and user data profiles and administrative servers that are local or remote from GK 120 in accordance with the present invention. Depicted arrows in FIG. 1 represent either typical events or communication messages utilized for mobility management including back-end services.

Numbers for each arrow may represent a sequence of events, for example, the movement of a mobile entity as a first event 1 that precedes a second event 2 which may be a transmittal of a mobility gatekeeper advertisement (MGA) message from GK 120. Now GK 120 periodically transmits such an MGA message and so the event of sending a message numbered 2 may precede the event 1 of a mobile entity moving to a point B. Yet, the receipt of the MGA message by mobile entity 100 at point B would necessarily have to occur after the terminal 100 has moved to point B. So the event number may not identify a specific sequence.

Figure 2:
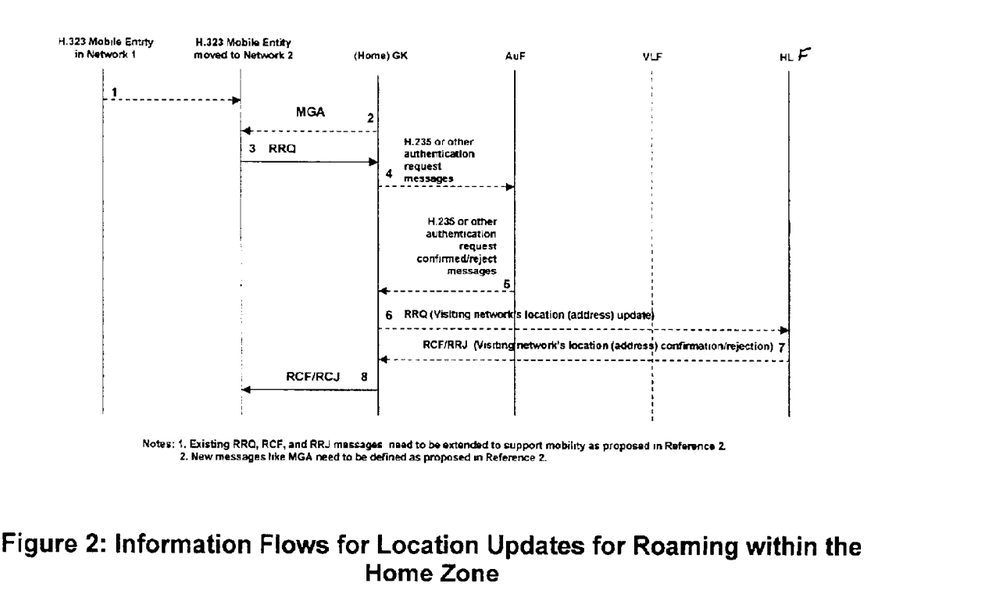
FIG. 2 provides a message flow chart for a typical intra-zone call whose message numbers correspond to the number of the arrows utilized in FIG. 1 showing message flow.

In FIG. 1, a mobile entity that has moved such as mobile entity 100(B) can discover a GK 120 supporting mobility management services by either receiving a mobility gatekeeper advertisement (MGA) message or periodically sending gatekeeper request GRQ messages as it moves from one point of attachment, such as one point A to another point of attachment such as B. Referring briefly to FIG. 2, event 2 represents the discovery of the mobile entity in the home zone at a new point of attachment and so encompasses either method. Once a mobility management capable gatekeeper, for example, (Home) gatekeeper (GK) 120 is determined, an endpoint B is registered to the GK 120 for admission to system access through a registration, admission and status (RAS) channel as taught in my prior patent applications. When an H.323 mobile entity roams from one place to another, as will be discussed in greater detail herein, the point of attachment (represented by a network [e.g., IP] address or an H.323 location [a zone or domain boundary]) may change. Mobile gatekeepers make themselves known by periodically sending MGA advertisement messages. If a registration lifetime expires, the mobile entity is also presumed or considered to be logically disconnected. However, the discovery or detection of a new point of attachment for mobile entity 100 (in the example of FIG. 1, from A to B) can be accomplished either via calculating advertisement lifetime or via address prefixes as follows:

Advertisement Lifetime: A first method of detection is based on the lifetime field within the main body of an MGA message because the mobile entity 100 is not considered connected logically to the network in whose boundaries it is located if the lifetime for registration expires. A mobile entity 100 may record the lifetime received from interpreting any periodic mobility gatekeeper advertisement (MGA) messages, until that lifetime expires. If the mobile entity has not maintained contact with its mobile GK, such as GK 120, the mobile entity must attempt to solicit a new mobile GK.

Address Prefixes of the Zone and the Network Point of Attachment: The second method uses the transport address prefixes (e.g., IP subnetwork addresses or IP addresses) provided in a zoneRange field of the received MGA messages. A mobile entity can detect whether or not it is within a given zone by examining the address prefixes of the most recently received MGA message for a match with the last MGA message it received. However, a mobile entity 100 also has to know whether it is in the same or different network point of attachment once it detects that it is in the same zone. To detect whether a mobile entity 100 is in a given network point of attachment (for example, IP address) or not, it has to know the network address into which it has moved currently. This network determination may be most conveniently a matter of implementation within the network layer. If an H.323 mobile entity 100 is in a given network of a given zone, it is expected that it will receive the advertisement message of the network address by its network layer entity. In this way, a mobile entity 100 can determine whether or not a newly received advertised network address was received in the same network as the mobile entity's home or current care-of transport address. If the addresses differ, the mobile entity can assume that it has moved. A match indicates it has not. It can be clearly seen then how a mobile entity 100 can detect whether it has moved from a given zone to another. If it is in a given zone, it can also detect whether it has moved from its current network point of attachment or not.

Figure 3:
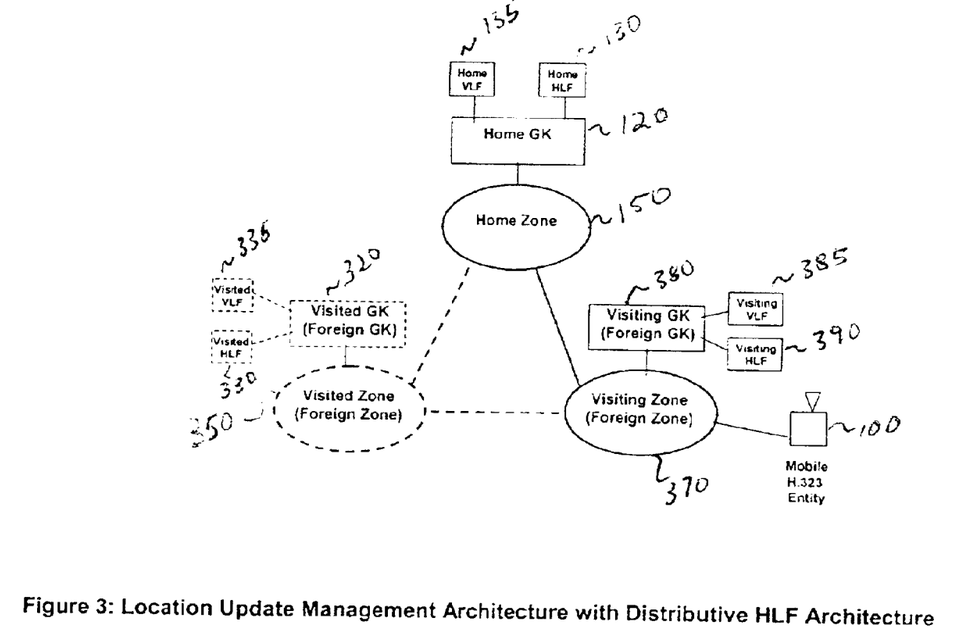
FIG. 3 is represents a distributed home location function (HLF) and visitor location function (VLF) architecture whereby each of a home gatekeeper, a previously visited gatekeeper and a presently visiting gatekeeper maintain their own home location and visitor location databases.

Referring briefly to FIG. 3 for an inter-zone call, after discovering that the mobile entity 100 is now in a foreign zone 370 (from its home zone 150), it can obtain a new care-of transport address for this new network of a new zone from the prefix advertised by the new router and perform location update procedures. In mobile H.323, the mobile entity's registration messages trigger a mobility binding at the home agent, associating the mobile entity's home transport address with its new care-of transport address for the specified binding lifetime.

Now endpoint registration will be discussed in the context of FIGS. 1 and 3. The same registration procedure as described in H.323 shall be used once a mobility capable gatekeeper GK is discovered (or the GK discovers the mobile entity). However, the extended RRQ/RCF/RRJ messages shall be used as described in my prior patent applications. In H.323, registration is the process by which an endpoint joins a Zone, and informs the Gatekeeper of its Transport Address and alias addresses. As a part of their configuration process, all endpoints shall register with the Gatekeeper (GK) identified through the discovery process discussed above. Registration shall occur before any calls are attempted and may occur periodically as necessary (for example, at endpoint power-up).

Mobility management services for, for example, intra-zone and inter-zone mobility were discussed to some extent in my prior patent applications referenced above but the discussion is supplemented here in the context of providing backend services (BES) such as authentication and mobile entity location update services. A mobile entity's location is updated using the registration process (including the RRQ/RCF/RRJ messages). However, it is shown in my prior applications that an H.323 mobile entity 100 needs to bind its new and old location information as it roams from one place to another. As a result, new mobility binding request (BuRQ), mobility binding confirmed (BuCF), and mobility binding reject (BuRJ) messages may be required as described in my prior applications. The updating of the mobile entity's location as it moves from one place to another, is known as the mobility management although the discovery and registration processes described above are also a part of mobility management.

Now an Intra-Zone H.323 mobile entity 100 will be further discussed with reference to FIGS. 1 and 2. FIG. 1 shows an example how the location data can be updated when a mobile entity roams within a zone (i.e., intra-zone) depicted as event 1 by a dashed arrow. A home zone having a home gatekeeper GK 120 may have one or many network addresses (e.g., IP network addresses). It is considered that a mobile entity 100 subscribes to a mobility service through registration with the (home) GK 120. However, the mobile entity 100 and the home gatekeeper 120 need to do the following in order to provide the mobility services properly because the gatekeeper 120 should track the mobile entities as they move from one point, for example, point A, to another point, for example, point B: 1) an H.323 mobile entity 100(B) will be given its home zone ID and home GK ID and associated addresses; 2) an H.323 mobile entity 100(b) will declare its home network 110-1 (e.g., IP address) to determine whether its network point of attachment has been changed to a foreign network; and 3) the home network address, home zone ID, home GK ID and associated addresses will be kept in the HLF 130 by the home GK 120 at the time of subscription/registration of the mobile services.

Referring to FIG. 1, it is shown that the mobile entity 100 has moved via dashed arrow 1 from its home network 110-1 to a foreign network 110-2 within the same administration domain of gatekeeper 120. If the mobile entity 100 moves to network 2, it will detect its new network point of attachment B in two ways as described above. The mobile entity 100 will acquire the new temporary care-of network address dynamically (for example, via DHCP in the case of IP network). Although the mobile entity 100 is still under the control of the same GK 120 in FIG. 1, the mobile's new network attachment B to, for example, foreign network 110-2 needs to be updated with the its home GK 120.

Referring to FIG. 2, there is shown the information flow for the mobility management where location updates are needed as the mobile moves from one place to another within its home zone. Mobile entity 100 may move, for example, from a local exchange carrier network to a connection via a long distance carrier, for example, AT&T or change long distance carrier points of attachment from one toll carrier to another. The numerals on the arrows in FIG. 1 correspond to the event numbers described below. The following steps can be taken to update the location of the mobile entity: Event 1—An H.323 mobile entity 100 moves from its home network 110-1 to a foreign network 110-2 in its home zone 150; (it is assumed that the mobile entity 100 registers with its home GK 120 that network 110-1 is its home network along with the fact this gatekeeper GK 120 is its designated home GK). Event 2—The H.323 mobile entity 100 at point B detects the MGA message from its home gatekeeper and determines it is in a new network 110-2 but in its home zone 150. Event 3—The H.323 mobile entity 100 re-registers with the GK 120 using the extended RRQ request message as described in my prior patent applications. Event 4—The home GK 120 authenticates the mobile entity (H.235 or other authentication messages) with AuF 125 according to the present invention. Authentication may typically involve a database look-up via the user's unique identification number for their H.323 mobile terminal to discover the terminal's user profile. The profile may contain, for example, the identity of a plurality of networks and network service offerings to which the entity is subscribed including but not limited to local exchange services, Internet services, cable television services, satellite services, paging services and wireless services and the credit rating they have with each service provider. The mobile entity 100 may be requesting a download of a movie for storage or display. So authentication involves verification of identity of the terminal, the requested service, their terminal's ability to receive the requested service and their credit-worthiness. There may be any number of reasons why authentication is not confirmed and is rejected. Event 5—AuF 125 sends authentication confirmation/reject messages to the GK 120. However, authentication is also coupled with RRQ messages and, in accordance with the present invention, authentication messages as a stand alone entity separate from RRQ request message sequence may not be required. Event 6—GK 120 updates the location information of the mobile entity 100 (B) with the HLF 130 using an RRQ request message because the mobile entity 100 is now in a visiting network 110-2 but because the mobile entity 100 remains in its home zone 150. (VLF 135 that keeps the location information if a mobile entity 100 visits from a foreign zone is not required.) The HLF will now store, for example, that mobile entity 100 is now associated with a different network and, in the event of an inter-zone move, the identity of the visiting zone and network as will be described further herein. Event 7—HLF 130 sends mobile entity 100 location update confirmation/rejection using RCF/RRJ message to the (home) GK 120. Event 8 (Home) GK 120 sends back the registration confirmation/rejection (RCF/RRJ) message back to the mobile entity 100(B).

In this way, the home GK 120 will be able to update the location information about the mobile entity 100 that has moved intra-zone 150. The HLF 130 will properly reflect that the unique identification code of the H.323 mobile entity 100 is now associated with network 110-2 at new point of attachment B, reflecting, for example, a change of local exchange carrier or long distance networks. It may be noted that the mobility binding messages (BuRQ/BuCF/BuRJ) described in my prior patent applications are not involved for the intra-zone mobile entity location change. In some instances, the mobile entity 100 might have communicated with an entity located within a foreign zone or the mobile has just returned from the foreign zone to its home zone. In those cases, the home GK 120 would need to update those foreign gatekeepers GKs about the location of the mobile using the BuRQ/BuCF/BuRJ messages.

Now an Inter-Zone H.323 mobile entity will be discussed with reference to FIG. 3 for an overview of an inter-zone location change. In FIG. 3, the same reference numerals as used in FIG. 1 will be used to represent similar entities, for example, mobile entity 100 and home gatekeeper 120. New elements introduced for the first time will appear with the most significant digit representing the Figure number, for example, visited gatekeeper 320.

In inter-zone communications, at least two gatekeepers (GK) are involved to communicate among themselves and three are depicted, a home GK 120, a visited previously GK 320 and a visiting now GK 370. A gatekeeper function may represent a geographic area or region, for example, sections of a large country such as the United States of America or a whole country such as Switzerland or a gatekeeper function may be established for one of each of a plurality of H.323 networks. In our mobility management inter-zone entity movement, we will assume that an H.323 mobile entity 100 is moving to a new foreign zone crossing its home zone boundary which, as discussed above, may represent a network and/or a geographic boundary. The last visited zone 350 is represented along with the most recently visited or presently visiting zone 370. In accordance with the present invention, the VLF function is shown associated with each gatekeeper GK (for the home, visited and visiting zones) in a distributive way. Visiting gatekeeper 380 has associated therewith visiting VLF 385, and visited gatekeeper 320 has associated visited VLF 335.

Figure 8:
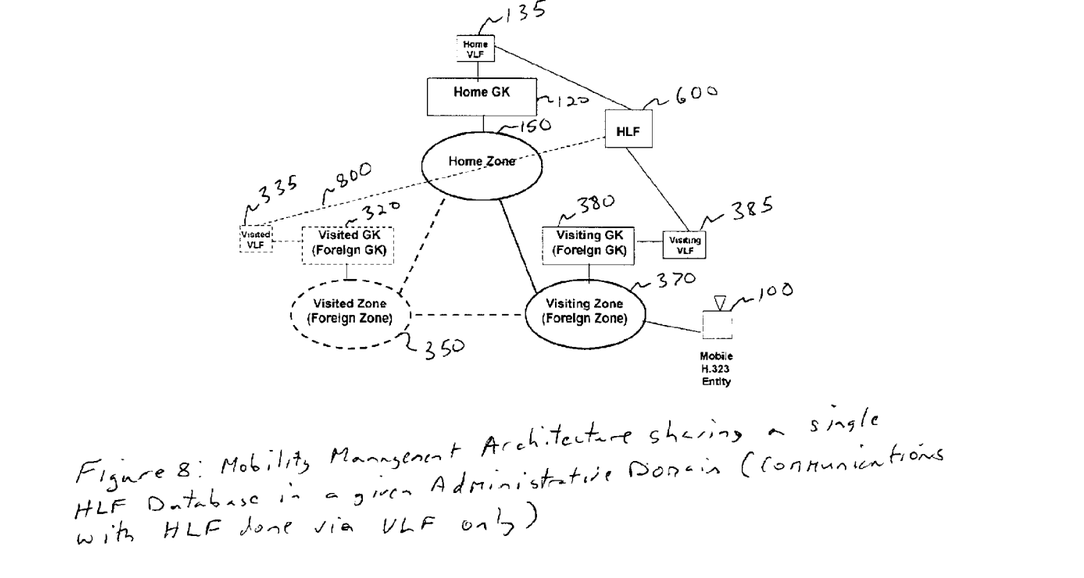
FIG. 8 provides an architecture that explores whether a home location functionality (HLF) may be centralized and serves as the basis for the discussion of the message flowchart of FIG. 9 in which the visited VLF communicates with the centralized HLF.

However, there are several possibilities for designing the HLF functionality: 1) distributive as it is in the case of VLF and as depicted in FIG. 3, 2) centralized as will be described and shown in FIG. 6 and 3) centralized but communications via VLF only as is shown in FIG. 8. Each HLF architecture scheme had its own advantages and disadvantages. Before discussing these options, a distributed architecture will be discussed with reference to FIG. 3 depicting a distributed HLF function. FIG. 3 also shows a configuration where each GK has its own VLF and HLF functions. Each VLF/HLF function is managed by each GK in a distributive fashion.

FIG. 3 shows an example how a mobile H.323 entity 100 can roam from zone-to-zone and how the system keeps a record of the subscribed mobile entity's location. That is, an H.323 mobile entity 100 moves from a visited (foreign) zone 350 to a visiting (foreign) zone 370 and needs to update various HLF and VLF databases with their current point of attachment, network and zone. Depending on the service requested, there is also an authentication process associated with authenticating the terminal that has moved to receive the requested service. The terminal location updating process is more fully described with reference to FIG. 4.

Figure 4:
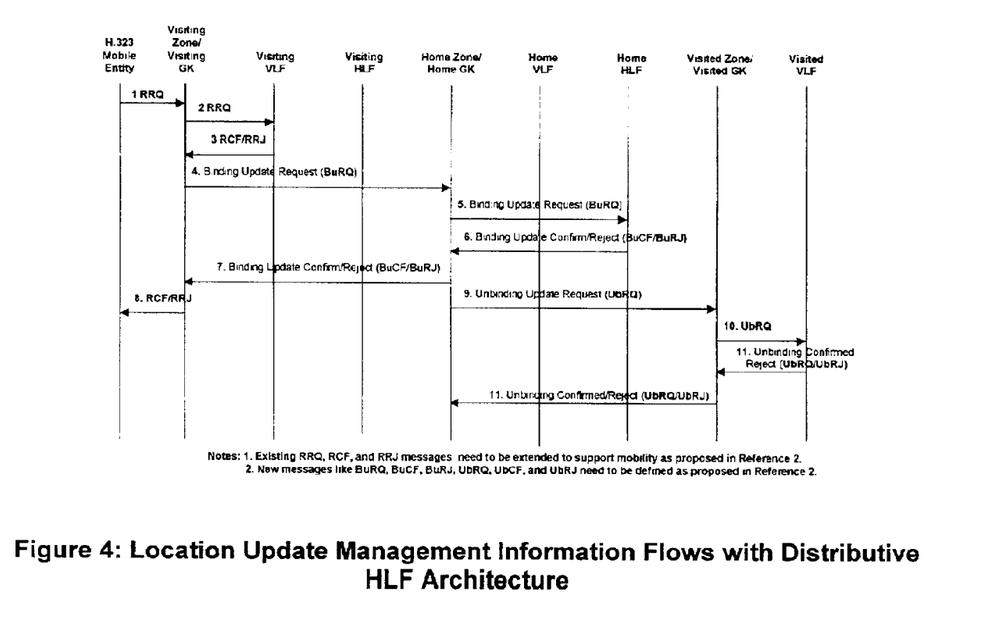
FIG. 4 provides a message flow chart for a message flow for an inter-zone mobile entity to home, visiting and visited gatekeeper administered home location and visitor location functionality.

FIG. 4 shows the information flows as the mobile entity 100 moves from one place to another for inter-zone communications as depicted in FIG. 3. The arrows and numbers above the arrows as with FIG. 2 may represent a sequence of events or messages. It has been described earlier how a mobile entity 100 will detect whether or not it has crossed an administrative zone or domain boundary. Upon crossing the zone boundary, the H.323 mobile entity 100 may receive an MGA message broadcast by the foreign (visiting) GK 380. This event is not shown in FIG. 4 and is presumed included in event 1 only labeled RRQ. If the MGA is received from the foreign zone, mobile entity 100 will send an RRQ message (event 1) to the visiting GK 380. Alternatively, the H.323 mobile entity 100 can also send the GRQ message as described above seeking a registration with the foreign GK 380 if no MGA message is received. In this instance, the usual GCF/GRJ messages will be exchanged before sending the registration message (presumed as included in event 1 in FIG. 4). These several steps of discovery and registration are not shown in FIG. 4 for simplicity and are presumed included in event 1. The following events describe how the location update is done once the registration with the visiting GK 380 is sought by the mobile H.323 entity 100: Event 1—The RRQ (extended in accordance with my prior patent applications) message is sent by the mobile entity 100 to its visiting GK 380. Event 2—The visiting GK 380 has no information about the entry of this mobile entity 100 because this new entity has moved into its serving zone recently. So, it will consult its VLF 385 to register the information about the visiting mobile entity 100. We may use the same extended RRQ message for communications between the GK 380 and the VLF 385 (or we may define a new message).

However, an authentication with the AuF is also needed, not shown in FIG. 4 for simplicity (because authentication will primarily depend on a visitor's home GK/AuF/HLF as already shown in FIGS. 1 and 2). The question will be answered whether the mobile entity 100 is authentic (can be found by their terminal ID in a terminal profile database and whether the mobile entity 100 is entitled to receive the requested service. However, there may also be an issue related to authentication of mobile entity 100. The authentication is done in collaboration with the home GK 120 and the mobility binding update messages shown in the subsequent steps (events) will take care of this. Event 3—The visiting VLF 385 sends a response back to the visiting GK 380 either confirming or rejecting the registration (there are few reasons to reject the registration by the VLF 385 other than storing the information in its database). Event 4—However, the visiting GK 380 needs to update the mobile's location to the home GK 120 of the mobile entity 100. Receiving the RRQ message, a mobile (visiting) GK 380 can know where the mobility binding needs to be done. In this example, the visiting GK 380 sends the mobility update binding request (BuRQ) message as defined in my prior applications to the mobile entity's home GK 120. This message will include the identity of the mobile entity 100 as well as identity of the visiting GK 380 that sent the message. Event 5—Upon receiving the BuRQ message, the home GK 120 stores the mobile entity's new location at the visiting GK 380 and examines the mobile entity's information (e.g., user profiles, calling origination and termination services, authentication parameters, accounting information, subscriber services, etc.) after sending the message to the home HLF 130. Event 6—The home HLF 130 sends the confirmation (BuCF) or rejection (BuRJ) message as described in my prior applications with respect to the mobile entity's new location to the home GK 120.

Event 7—The home GK 120 sends the confirmation (BuCF) or rejection (BuRJ) message as described in my prior applications back to the visiting GK 380. Event 8—Accordingly, upon receiving this information (BuCF or BuRJ), the visiting GK 380 sends a registration confirmation (RCF) or a rejection (RRJ) message to the mobile entity 100. Event 9—It can noted that events 5 and 9 can be initiated by the home GK 120 simultaneously to expedite the operation. (It may also be noted that the mobile entity 100 might have already visited another foreign zone [visited zone] 350 before moving to the visiting zone 370. The BuRQ message also indicates whether or not the updating message has been sent to the visited GK 320 by the visiting GK 380.) If the visited GK 320 is not informed for the mobility unbinding by the visiting GK 380, the home GK 120 sends the mobility unbinding message UbRQ for updating the location to the visited GK 320 related to the H.323 mobile entity's information in its database. (In some situations, the mobility binding message (BuRQ) may also be sent for updating without deleting the previous information. This is a matter of design implementation and choice.) Event 10—In turn, the visited GK 320 sends the UbRO message to its visited VLF 335. Event 11—The visited VLF 335 sends the mobility unbinding confirmation (UbCF) or rejection (UbRJ) message to the visited GK 320. (The mobility binding confirmation (BuCF) or rejection (BuRJ) message needs to be sent if the BuRQ message is sent in event 9.) Event 12—In turn, the visited GK 320 sends the UbCF/UbRJ message to the home GK 120.

The mobile subscriber entity 100 must be known only to the visiting GK 380. That is, the mobile entity 100 is known only to one foreign GK at a time. In this example, when the subscriber has roamed to another zone, the home GK 120 has to be updated. Updating a visited gatekeeper 320 can occur as a lower priority functionality.

It can be seen that the home GK 120 is the master of the H.323 mobile entity's information base (may act as the master database of the mobile entities) and therefore coordinates changes to the visiting- and visited-GK's as the subscribed mobile entity roams through the zones. If needed, the information related to the targeted GK (not shown in this example) may also be coordinated by the home GK.

Another update technique in an inter-zone call according to the present invention is a smooth location update. As mobile entities move from one point of attachment to the next between zones, it may be preferable if the location updates using the mobility binding messages were as smooth as possible. For example, a home GK 120 may be too far away or physically remote from the mobile entity's visiting- and visited-zone to respond in time. If the responses for the updates require a GK to wait for hundred of milliseconds, the overall system's response time will increase by a significant amount. A smooth update method according to the present invention provides smooth location updates through cooperation between the visiting- and visited-GK without the involvement of the home GK. The mobile entity will authorize the visiting GK to perform smooth location update handoffs between the foreign zones before the new registration is completed with its home GK.

Figure 5:
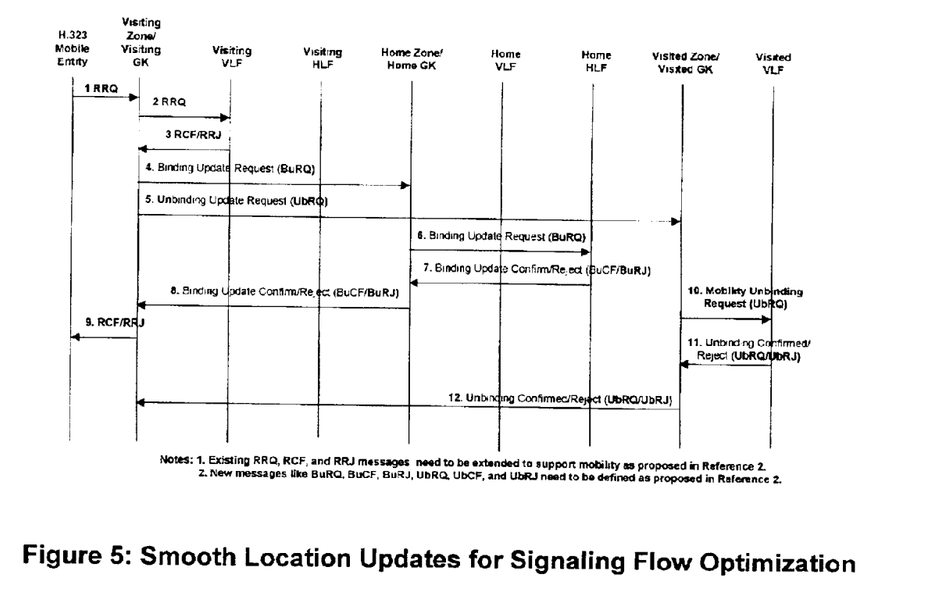
FIG. 5 shows a variation on the message flows of FIG. 4 which may provide faster services to a mobile H.323 entity recognizing that once the terminal has been authenticated and located in the visiting zone, certain message flows can proceed in the background to update home and visited location databases.

FIG. 5 shows this little variation of the signaling message flows which can be discovered by comparing the smooth location updates of FIG. 5 with those of FIG. 4 for the same network architecture as shown in FIG. 3. FIG. 5 shows, then how signal flow may be optimized to provide a more smooth mobile entity location update.

All steps are straight forward as already explained for FIG. 4. However, in this embodiment, the visiting GK 380 is sending the mobility location update messages directly to both the home GK 120 and the visited GK 320. The home GK 120 is not directly involved in unbinding the location information of the previously visited GK 320. However, the mobility binding request (BuRQ) message sent to the home GK 120 by the visiting GK 380 indicates whether or not the visiting GK 380 has sent the mobility unbinding message to the previously visited GK 320. Accordingly, the home GK 120 takes the action and its HLF database 130 is updated.

Previously, it was suggested that an HLF functionality may be centralized. Such a centralized HLF function will now be described with reference to FIG. 6. As already introduced, similar reference characters introduced in previous figures will bear the same reference numerals in FIG. 6. One new element in FIG. 6 is centralized HLF 600 shown connected by a solid line with home GK 120 and visiting GK 380 and by dashed line 650 with visited GK 320 representing a message link.

Figure 6:
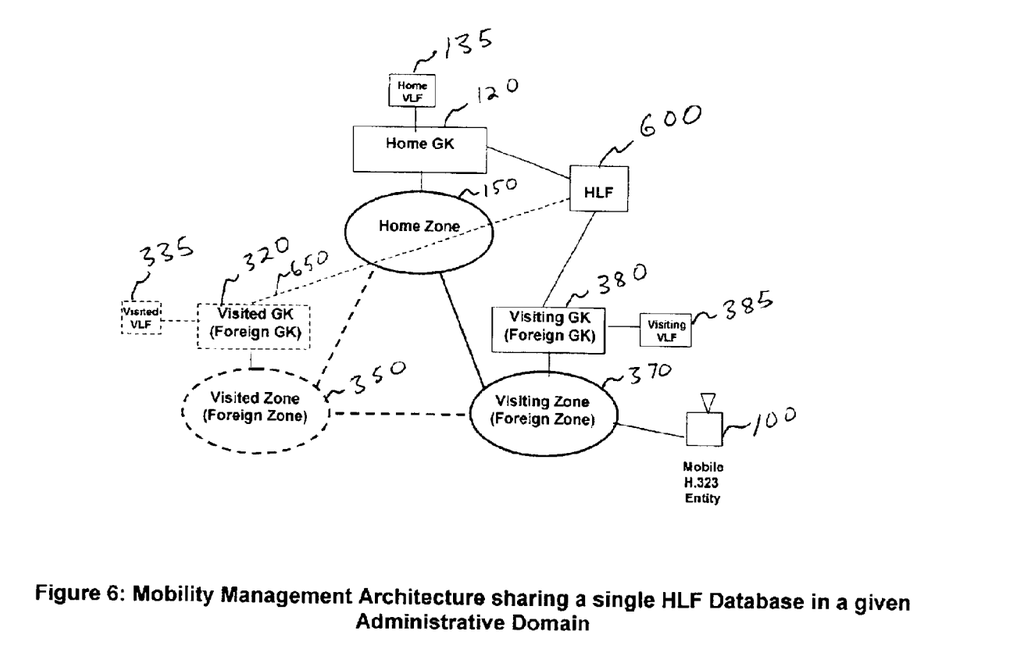
FIG. 6 provides an architecture that explores whether a home location functionality may be centralized for home, visited and visiting zones gatekeepers.

FIG. 6, consequently shows that all GKs in a given administrative domain may share a single centralized HLF database 600 according to one embodiment of the present invention. FIG. 6 shows a mobility management architecture sharing a single HLF database 600 in a given administrative domain, which may be sufficiently logically connected as to be able to achieve reasonable grade of service. Of course, as suggested above, if a given message transfer to or from the centralized HLF may exceed reasonable boundaries, then, the choice of a centralized HLF may not be appropriate. In FIG. 6, if reasonable, all GKs of this single administrative domain may be able to access the same HLF database 600 without keeping their individual HLF databases. The mobility management information flows are described in FIG. 7 for the architecture of FIG. 6.

Figure 7:
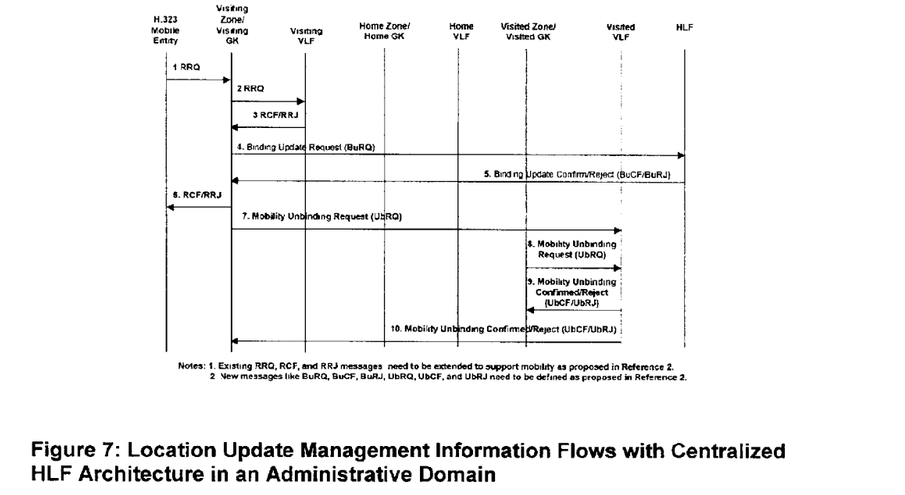
FIG. 7 shows a message flow chart for a message flow for an inter-zone mobile entity in which the visited gatekeeper communicates with the centralized home location functionality (HLF) of FIG. 6.

Referring now to FIG. 7, there are shown the mobile entity location update management information flows with a centralized HLF architecture in an administrative domain as shown in FIG. 6. Like the distributive HLF architecture of FIG. 4, the procedures and message flows still remain very similar except that there is only one HLF database 600. The difference between the distributive and centralized HLF architecture can be seen as a matter of implementations rather than from the protocol itself. The steps in FIG. 7 are described as follows: Event 1—The RRQ (extended in accordance with my prior applications) message is sent by the mobile entity 100 to its visiting GK 380. Event 2—The visiting GK 380 has no information about the entry of this mobile entity 100 because this new entity has moved in its serving zone recently. So, it will consult its VLF 385 to register the information about the visiting mobile entity 100. We may use the same extended RRQ message for communications between the GK 380 and the VLF 385 (or we may define a new message). However, an authentication with the AuF is also needed, and we have not shown this for simplicity as above; (we believe that the authentication will primarily depend on visitor's home GK/AuF/HLF). However, there may also be an issue related to the authentication. The authentication is done in collaboration with the home GK and the mobility binding update messages shown in the subsequent steps will take care of this. Event 3—The visiting VLF 385 sends a response back to the visiting GK 380 either confirming or rejecting the registration (there are little reasons to reject the registration by the VLF other than storing the information in its database). Event 4—However, the visiting GK 380 needs to update mobile entity's location to the home GK 120 of the mobile entity. Receiving the RRQ message, a mobile (visiting) GK 380 can know how the mobility binding needs to be done. In this example, the visiting GK 380 sends the mobility update binding request (BuRQ) message as defined in my prior applications to the centralized HLF 600 of this administrative domain. This message will include the identity of the mobile entity 100 as well as identity of the visiting GK 380 that sent the message. Event 5—The centralized HLF 600 sends the confirmation (BuCF) or rejection (BuRJ) message as describe in my prior applications with respect to the mobile entity's new location to the visiting GK 380. Event 6—Accordingly, upon receiving this information (BuCF or BuRJ), the visiting GK 380 sends registration confirmation (RCF) or rejection (RRJ) message to the mobile entity 100. Event 7—Both events 4 and 7 can be initiated by the visiting GK 380 simultaneously to expedite the operation. (It may also be noted that the mobile entity might have already visited another foreign zone [visited zone 350] before moving to the visiting zone 370. The BuRQ message also indicates whether or not the updating message has been sent to the visited GK 320 by the visiting GK 380.) If the visited GK 320 is not informed for the mobility unbinding by the visiting GK 380, the home GK 120 sends the mobility unbinding message UbRQ for updating the location to the visited GK 320 related to the H.323 mobile entity's information in its VLF database 335. (In some situations, the mobility binding message (BuRQ) may also be sent for updating without deleting the previous information. It is matter of implementation and has not been shown here.) Event 8—In turn, the visited GK 320 sends the UbRO message to its VLF 335. Event 9—The VLF 335 sends the mobility unbinding confirmation (UbCF) or rejection (UbRJ) message to the visited GK 320. (The mobility binding confirmation (BuCF) or rejection (BuRJ) message needs to be sent if the BuRQ message is sent in event 4.) Event 10—In turn, the visited GK 320 sends the UbCF/UbRJ message to the visiting GK 380 (should any problems occur with the UbRJ, the visiting GK 380 may be able to cancel [or update] the registration of the mobile entity 100).

Figure 9:
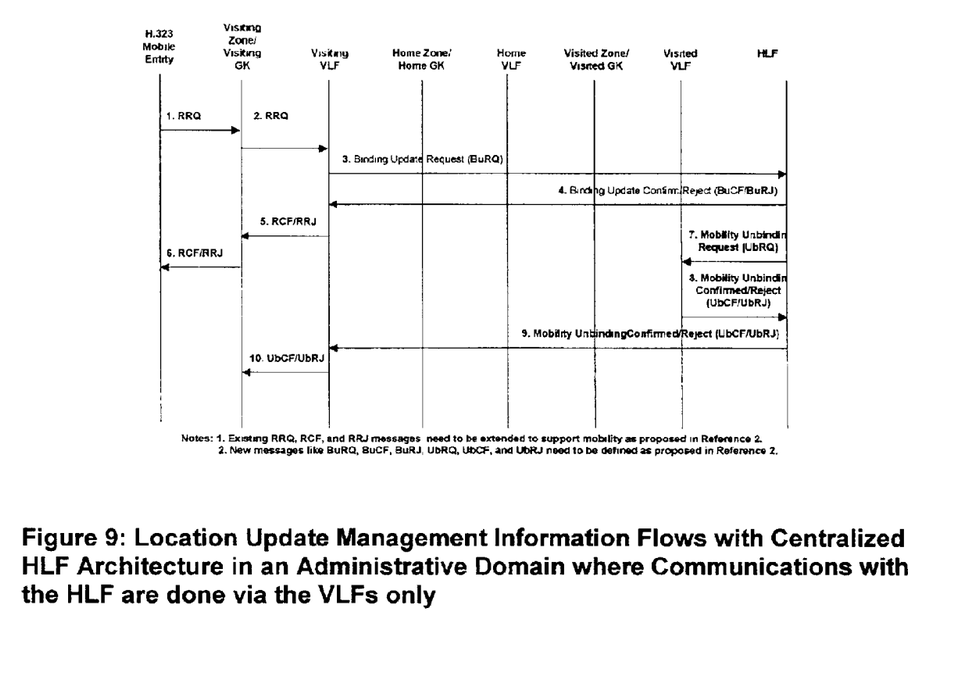
FIG. 9 is a message flowchart showing the case where a VLF communicates with a centralized HLF as introduced in FIG. 8.

Also introduced above was yet an another alternative embodiment in which a foreign VLF may communicate directly with a centralized HLF function 600 (HLF Communicating via VLF only). This embodiment is shown in FIG. 8 and involves a message link 800 shown between the visited VLF 335 and the centralized HLF function 600. Referring to FIG. 8 there is shown an architectural configuration where communications to the centralized HLF are only provided via the respective VLFs of the GKs, represented as the dashed line 650. The mobility management information flows are shown in FIG. 9 when communications with the HLF 600 are done via the VLFs of the respective GKs. The information message flows shown in FIG. 9 can be described as follows: Event 1—The RRQ (extended in accordance with my prior patent applications) message is sent by the mobile entity 100 to its visiting GK 380. Event 2—The visiting GK 380 has no information about the entry of this mobile entity 100 because this new entity has moved in its serving zone recently. So, it will consult its VLF 385 to register the information about the visiting mobile entity. We may use the same extended RRQ message for communications between the visiting GK 380 and its visiting VLF 385 (we may define a new message). However, an authentication with the AuF is also needed and we have not shown this for simplicity (we believe that the authentication will primarily depend on visitor's home GK/AuF/HLF). However, there may also be an issue related to the authentication. The authentication is done in collaboration with the home GK 120 and the mobility binding update messages shown in the subsequent steps will take care of this. Event 3—However, the visiting VLF 385 needs to update the mobile's location to the home GK 120 of the mobile entity 100. Receiving the RRQ message, a visiting VLF 385 can know how the mobility binding needs to be done with the centralized HLF 600. The visiting VLF 385 consequently may send the mobility update binding request (BuRQ) message as defined in my prior patent applications to the centralized HLF 600 of this administrative domain in this embodiment of the present invention. This message will include the identity of the mobile entity 100 as well as identity of the visiting GK 380 that initiated the message to the visiting VLF 385. Event 4—The HLF 600 sends the confirmation (BuCF) or rejection (BuRJ) message with respect to the mobile entity's new location to the visiting GK 380. Event 5—Accordingly, upon receiving this information (BuCF or BuRJ) from the HLF 600, the visiting VLF 385 sends registration confirmation (RCF) or rejection (RRJ) message to the visiting GK 380. Event 6—In turn, the visiting GK 380 sends the registration confirmation (RCF) or rejection (RRJ) message to the mobile entity 100 (that happens to be the visitor in its zone). Event 7—(It may also be noted that the mobile entity 100 might have already visited another foreign zone [visited zone 350] before moving to the visiting zone 370. The BuRQ message sent by the visiting VLF 385 also indicates whether or not the updating message has been sent to the visited GK 320 by the visiting GK 380.) If the visited GK 320 is not informed for the mobility unbinding by the visiting GK 380, the HLF 600 sends the mobility unbinding message UbRQ for updating the location to the visited VLF 335 via link 800 related to the H.323 mobile entity's information in its database. (In some situations, the mobility binding message (BuRQ) may also be sent for updating without deleting the previous information. It is matter of implementation and design.) Event 8—The visited VLF 335 sends the mobility unbinding confirmation (UbCF) or rejection (UbRJ) message to the HLF 600 over the link 800. Event 9—Receiving the confirmation from the visited VLF 335, the HLF 600 sends the UbCF/UbRJ message to the visiting VLF 385 for confirmation. Event 10—In turn, the visiting VLF 385 sends the UbCF/UbRJ message to the visiting GK 380 for confirmation (should any problems occur with the UbRJ, the visiting GK 380 may be able to cancel [or update] the registration of the mobile entity 100).

Thus, there has been shown how the different HLF architectures of FIGS. 3, 6 and 8 can result in different message flows among the elements thereof using the same H.323 mobility management protocol. The difference in HLF architecture will only cause some changes in the number of message flows with the change in flexibility. For example, the distributive architecture of FIG. 3 provides the most flexibility in communications, while the centralized architectures of either FIG. 6 or 8 provide the least number of message flows assuming that there is only one centralized HLF 600 in a given administrative domain. A mobile entity 100 may receive at their roaming terminal their e-mail messages, paging messages, downloads of software from software servers, compressed movie or composite video data streams from CATV, movie, or satellite delivery services, facsimile transmissions, voice messages and the like once authenticated according to the present invention. We have also shown smooth mobile entity location updates in accordance with FIG. 5 in the case of distributive architecture of FIG. 3 that improves the response time to a mobile entity through parallel processing of the signaling messages. The assumption of having a single VLF (not shown) in a given administrative domain may be very restrictive because a large carrier network that grows very fast may not always be viable under this assumption.

In a more restrictive environment where a central VLF of a given administrative domain (not shown) needs to be communicated via the VLFs of the respective gatekeepers GK may not be good enough to optimize the message flows. In addition, this architecture is also very restrictive when multiple administrative domains are involved. For example, H.225.0 Annex G defines inter-administrative domain communications using the concept of border elements (BE's) and border elements can be co-located with the GK (or the standard may be enhanced for using the H.225.0 Annex G messages between the GK and the BE's). In this case, no standard is presently defined for communications between the BE of a given administrative domain to an HLF of another administrative domain. The communications are defined via BEs/GKs between the administrative domains. Moreover, it may not be always be practical, for example, due to the response times for messages that an administrative domain will have only one HLF.

While it may appear from reading the above that the discussion centers around a wireless mobile entity 100, such is not the case. The services needed to manage mobility for H.323 entities are equally applicable to both wire-line and wireless networks in a given administrative domain. The point of attachment may represent a wireless or wired link. The primary services, regardless of the type of mobile entity, that are needed are discovery of the mobile gatekeepers (GKs), registration with the GK, location updates with the H.323 mobile's visiting, home, and visited GK along with interaction with the visitor location function (VLF), home location function (HLF), and authentication function (AuF) per the present invention, call establishment for mobile-to-mobile, mobile-to-fixed, and fixed-to-mobile communications environment, and roaming as the mobile entities change their point of attachments (e.g., network point of attachment, zone/domain point of attachment).

The mobility management information flows are provided for intra-domain and inter-zone communications. In inter-zone communications, several scenarios have been considered based on different HLF architectures: Distributed HLF (FIG. 3), Centralized HLF (FIG. 6), and Centralized HLF with communications via VLF only (FIG. 8). The pros and cons for each HLF architecture have also been discussed. The choice of a distributive or centralized HLF architecture is a matter of implementation and design choice where one important issue may be message response time; however, the mobility management protocol proposed here and in my prior patent applications is broad enough to be applicable in any HLF implementation architectural schemes. It is shown that the existing H.323 RAS signaling messages (GRQ, GCF, GRJ, RRQ, RCF, RRJ, URQ, UCF, URJ, LCF) may be extended to support mobility. In addition, new RAS signaling messages (MGA, BuRQ, BuCF, BuRJ, UbRQ, and UbRJ) may be defined.

What I claim is:

1. A method of accessing a home location functionality for H.323 mobility management comprising the steps of
periodically transmitting a mobility gatekeeper advertisement message,
receiving a response from an H.323 mobile entity indicating a move from a first point of attachment to a different point of attachment to an H.323 communications network,
responsive to said move, outputting a visiting network location update request message from an H.323 home gatekeeper to said home location functionality and
in the event said update is successfully accomplished, receiving a visiting location confirmation message at said H.323 home gatekeeper.

2. A method of accessing a home location functionality as recited in claim 1 wherein said different point of attachment is in a different administrative domain and said home location functionality is centralized for a plurality of H.323 home gatekeepers associated with different administrative domains.

3. A method of accessing a home location functionality as recited in claim 1 wherein said home location functionality is distributed, there being a home location functionality associated with each H.323 gatekeeper in an administrative domain.

4. A method of accessing a visitor location functionality for inter-zone H.323 mobility management comprising the steps of
periodically transmitting a mobility gatekeeper advertisement message,
receiving a response from an H.323 mobile entity indicating a move from a first point of attachment to a different point of attachment in a visiting administrative domain of an H.323 communications network,
responsive to said move, outputting a visiting network location update request message from an H.323 visiting gatekeeper to a visiting visitor location functionality associated with said H.323 visiting gatekeeper,
in the event said update is successfully accomplished, receiving a visiting location confirmation message at said H.323 visiting gatekeeper
outputting a request to a home zone H.323 gatekeeper to request a binding home confirmation for said move and
in the event of the home H.323 gatekeeper's updating an associated home location functionality, receiving a binding update confirmation message at said visiting H.323 gatekeeper.

5. A method of accessing a visitor location functionality as recited in claim 4 further comprising the steps of
said home zone H.323 gatekeeper outputting a visiting network location update request message from an H.323 home gatekeeper to said associated home location functionality and
said associated home location functionality being centralized for a plurality of H.323 home gatekeepers associated with different administrative domains.

6. A method of accessing a visitor location functionality as recited in claim 4 further comprising the steps of
said home zone H.323 gatekeeper outputting a visiting network location update request message from an H.323 home gatekeeper to said associated home location functionality and
said associated home location functionality being distributed among a plurality of H.323 home gatekeepers associated with different administrative domains.

7. A method of accessing a visitor location functionality for inter-zone H.323 mobility management comprising the steps of
periodically transmitting a mobility gatekeeper advertisement message,
receiving a response from an H.323 mobile entity indicating a move from a first point of attachment to a different point of attachment in a visiting administrative domain of an H.323 communications network,
responsive to said move, outputting a visiting network location update request message from an H.323 visiting gatekeeper to a visiting visitor location functionality associated with said H.323 visiting gatekeeper,
in the event said update is successfully accomplished, receiving a visiting location confirmation message at said H.323 visiting gatekeeper outputting a request to a home zone H.323 gatekeeper to request a binding home confirmation for said move substantially simultaneously with a request to a visited zone H.323 gatekeeper to request an unbinding visited confirmation and in the event of the home H.323 gatekeeper's updating an associated home location functionality, receiving a binding update confirmation message at said visiting H.323 gatekeeper.

8. A method of accessing a visitor location functionality as recited in claim 7 further comprising the steps of said home zone H.323 gatekeeper outputting a visiting network location update request message from an H.323 home gatekeeper to said associated home location functionality and said associated home location functionality being centralized for a plurality of H.323 home gatekeepers associated with different administrative domains.

9. A method of accessing a visitor location functionality as recited in claim 7 further comprising the steps of said home zone H.323 gatekeeper outputting a visiting network location update request message from an H.323 home gatekeeper to said associated home location functionality and said associated home location functionality being distributed among a plurality of H.323 home gatekeepers associated with different administrative domains.

10. A method of accessing a home location functionality for inter-zone H.323 mobility management comprising the steps of periodically transmitting a mobility gatekeeper advertisement message, receiving a response from an H.323 mobile entity indicating a move from a first point of attachment to a visiting point of attachment to an H.323 communications network, responsive to said move, outputting a binding location update request message from an H.323 visiting gatekeeper to a centralized home location functionality and in the event said update is successfully accomplished, receiving a visiting location binding confirmation message at said H.323 visiting gatekeeper.

11. A method of accessing a home location functionality for inter-zone H.323 mobility management comprising the steps of periodically transmitting a mobility gatekeeper advertisement message, receiving a response from an H.323 mobile entity indicating a move from a first point of attachment to a visiting point of attachment to an H.323 communications network, responsive to said move, outputting a location update request to a visiting visitor location functionality associated with a visiting zone H.323 gatekeeper outputting a binding location update request message from said visiting visitor location functionality to a centralized home location functionality and in the event said update is successfully accomplished, receiving a visiting location binding confirmation message at said visiting visitor location functionality.

* * * * *